(12) United States Patent
Steingass

(10) Patent No.: US 6,418,628 B1
(45) Date of Patent: Jul. 16, 2002

(54) SPRING-LOADED CAR WINDOW BREAKER AND RETRACTABLE SAFETY SHEATH

(75) Inventor: Robert W. Steingass, Valparaiso, IN (US)

(73) Assignee: Task Force Tips, Inc., Valparaiso, IN (US)

( * ) Notice: Subject to any disclaimer, the term of this patent is extended or adjusted under 35 U.S.C. 154(b) by 0 days.

(21) Appl. No.: 09/815,285

(22) Filed: Mar. 23, 2001

(51) Int. Cl.[7] .................................................. B26F 1/32
(52) U.S. Cl. .......................................... 30/367; 30/366
(58) Field of Search .......................... 30/366, 367, 277, 30/368, 358, 359

(56) References Cited

U.S. PATENT DOCUMENTS

| | | | | |
|---|---|---|---|---|
| 2,787,179 A | * | 4/1957 | Warner | 30/167 |
| 2,894,273 A | * | 7/1959 | Fritschle | 30/167 X |
| 5,097,599 A | * | 3/1992 | Hasegawa | 30/367 X |
| 6,223,441 B1 | * | 5/2001 | Parsons | 30/367 |

* cited by examiner

Primary Examiner—Douglas D. Watts
(74) Attorney, Agent, or Firm—Lathrop & Clark LLP

(57) ABSTRACT

A multipurpose tool for use by firefighters and emergency personnel. The tool including a spanner wrench claw for turning firefighting hose connections, a wrench slot for turning natural gas valves, a glass-breaking spike, an open slot cutter for cutting seat belts and the like, and a foldable handle having an end shaped to be used as a pry bar. The tool may also be a spring-loaded glass breaker with a safety shield and another tool such as a seat belt cutter.

1 Claim, 3 Drawing Sheets

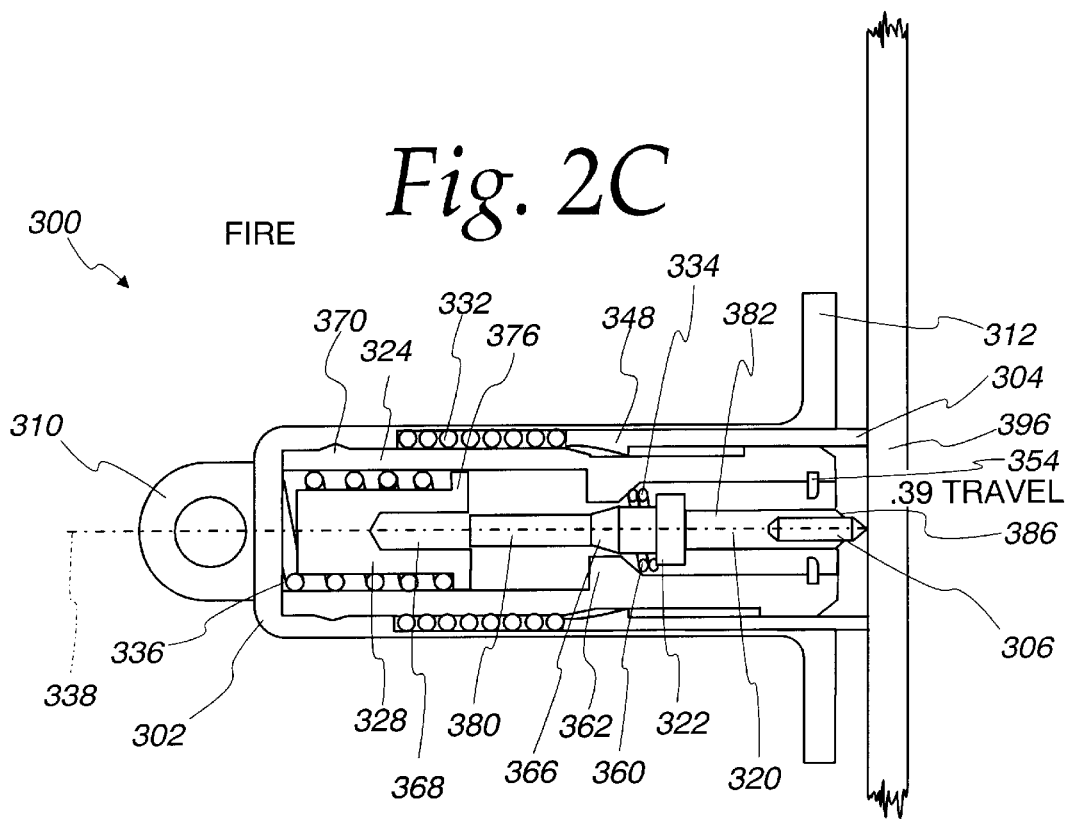

SPRING-LOADED CAR WINDOW BREAKER AND RETRACTABLE SAFETY SHEATH

FIELD AND BACKGROUND OF THE INVENTION

This invention relates generally to an emergency glass breaking device, and more particularly to a spring-loaded emergency glass breaking device that is easy and safe to use, and can be conveniently carried on a key chain or in a pocket or purse.

Glass breaking devices can be used in emergencies to gain access to or provide escape from an automobile or building. Specialized glass-breaking devices typically include a handle and a spike. The handle is swung like a hammer to impact the spike on a pane of glass to be broken. The spike is made of steel and is pointed to maximize the breaking power of the device.

Most glass breaking devices are available to emergency personnel such as firefighters, police, and emergency medical technicians. Some such devices are combined with other tools that are likely to be used by emergency personnel. For example, the Res-Q-Rench® available from Task Force Tips, Inc. of Valparaiso, Ind. includes a glass-breaking spike, a spanner wrench, a pry tool, a gas main wrench slot, and a seat belt cutter for extricating automobile passengers who are unable to remove their seat belts. Such devices are convenient and work extremely well, but they are not typically available to the general public.

Even if such a device were available to the general public, it would be inconvenient to carry in a pocket or purse, it would include tools that are unlikely to be used, and it is unlikely to be conveniently accessible for use in an emergency.

Further, glass breaking devices are typically wielded like a hammer. Some users may not have the strength or swinging room to use such devices effectively. Even when able to break glass, the force of the impact could cause shards of glass to hit people in the vicinity.

Thus, there is a need for a glass breaking device that is conveniently carried even by non-emergency personnel, and is safe and easy to use effectively.

SUMMARY OF THE INVENTION

The present invention is a glass breaking tool that is convenient to carry on a key chain, in a pocket or purse, or automobile glove compartment. It is spring-loaded and operates with a simple push of the device toward a window to be broken.

One embodiment of the present invention includes: a housing; a glass breaking point; a retractable safety sheath that shields the spike from snagging on clothing and also surrounds the spike while glass is broken to contain broken shards of glass; and a spring-loaded mechanism to impact the glass breaking spike with enough fore to reliably break glass.

In another embodiment, the window breaker can be cocked and fired in one motion. Preferably, the window breaker is cocked and fired by placing the window breaker against the window and pushing an outer housing toward the window. Pushing the housing part way toward the window compresses a firing spring that is in engagement with a hammer. Pushing the housing the remainder of the way causes the hammer to be released so that it impacts a glass-breaking spike that, in turn, impacts and breaks the glass.

The invention preferably is small enough to carry on a key chain, and it preferably includes at least one additional tool such as a seat belt cuter. When designed for being hung on a key chain, the connection to the keys can be easily releasable so that the glass breaker can be used without interference from the keys.

More features and objects of the invention are described below.

BRIEF DESCRIPTION OF THE DRAWINGS

FIG. 2C is the spring-loaded window breaker of FIG. 2A in the "fire" position; and FIG. 2D is the spring-loaded window breaker of FIG. 2A in the "break" position.

DETAILED DESCRIPTION OF THE DRAWINGS

Figure 1:
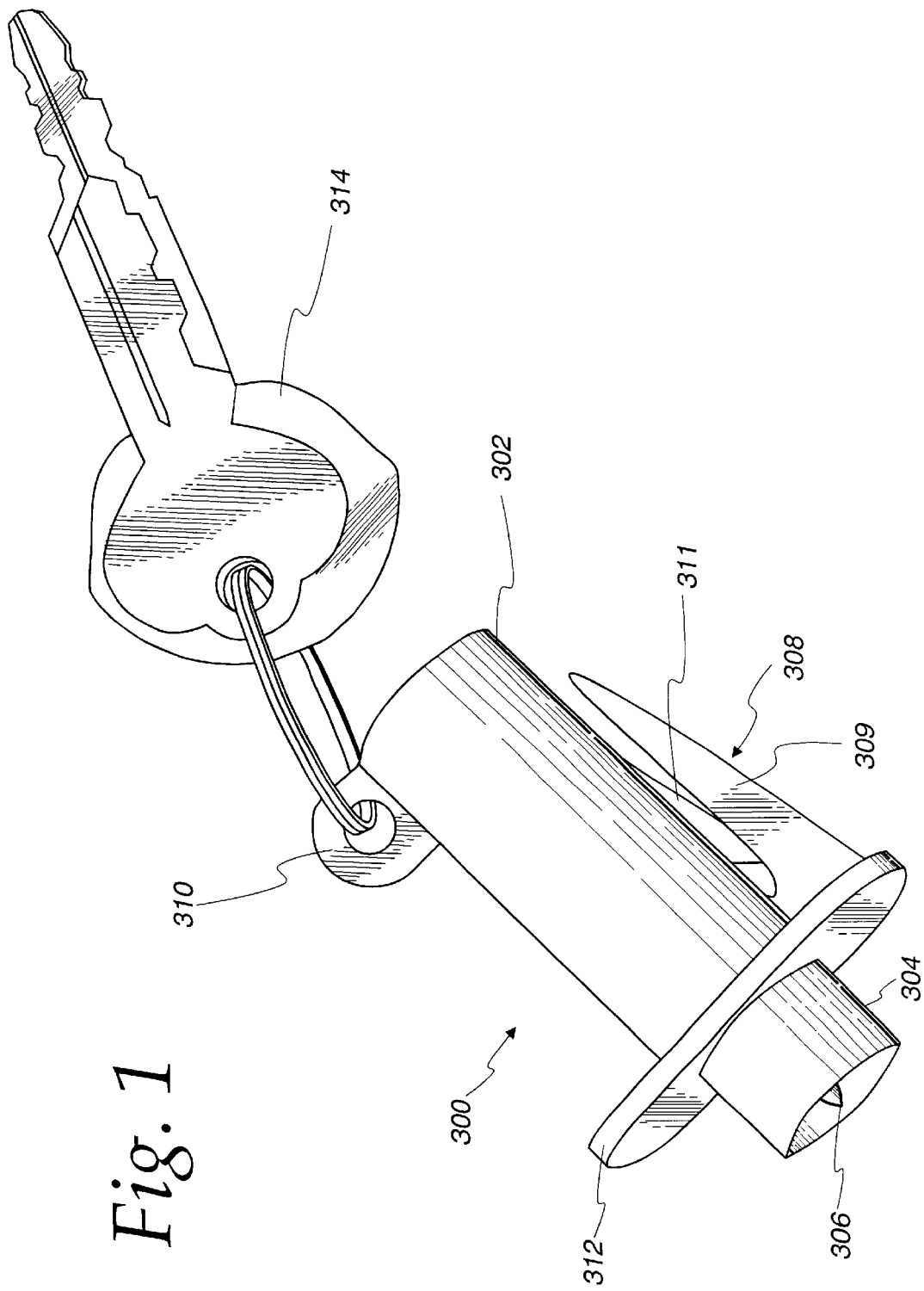
FIG. 1 is a perspective view of a spring-loaded window breaker in accordance with the present invention.

In the following detailed description of the drawings, the same reference numeral will be used in each of the figures to identify the same element.

One embodiment of a tool in accordance with the present invention, is a spring-loaded glass breaker 300 (FIGS. 1 and 2A–2D.) In FIG. 1, the glass breaker 300 is illustrated having a housing 302, a safety sheath 304, a glass breaking spike 306, a seat belt cutter 308, and a key chain loop 310. The key ring bob may be fitted with a pop-apart key ring connector to facilitate rapid retrieval of the multi-purpose tool in the event of emergency thereby eliminating the time and effort needed to extract the ignition key from the steering column of the car. One half of the pop-apart connector could be molded into the housing 302, and the other half of the connector mated to the key ring with an eyehole.

The housing 302 is illustrated in its preferred approximate size and configuration, which is generally cylindrical with a finger platform 312 that is used to apply pressure toward a window to be broken. Preferably, the housing 302 includes the key chain loop 310 so that the glass breaker 300 can be conveniently carried with car keys 314. The housing 302 can be any shape or size and is preferably compact enough to be a key chain bob, as illustrated.

The housing 302 also preferably includes one or more other tools that are appropriate for use with a glass breaker or other convenience-type tool. As illustrated, the housing 302 includes an integral seat belt cutter 308. This seat belt cutter 308, which is used to cut seat belts and shoulder harnesses in vehicles to gain access to injured motorists and passengers. The cutter 308 is defined by a hook 309 formed in the housing 302. The hook 309 is relatively robust where it connects to, or is otherwise formed integrally with, housing 302. At the opposite end, the hook 309 tapers to nearly a point so that it can readily hook into the material to be cut without being hung up on other materials. Disposed in the cutter 308 is a cutting edge 311 such as a razor blade, preferably a blade made of stainless steel. The cutting edge 311 is preferably disposed at an angle to the hook 309, as illustrated, to form a deep v-shape in which the seat belt will be secured and efficiently cut. The cutting edge 311 can be molded into, press-fit, or otherwise embedded in the housing 302 and hook 309 using a suitable adhesive. The blade can be permanently attached to the tool 300, or secured in a way to be field replaceable by being, for example, sandwiched between screwed together halves of the tool 300.

The safety sheath 304 is in a shape that essentially matches the housing 302 shape so that the two can move relative to one another with ease. In the illustrated example, the safety sheath 304 is cylindrical and coaxial with the cylindrical housing 302. The housing 302 and the safety sheath 304 define a longitudinal axis 338 along which both can move during operation of the glass breaker 300.

The purpose of the safety sheath 304 is to shield the glass-breaking spike 306 when not in use so that the spike 306 does not snap or puncture the user, pockets, purses, or anything else that may come into contact with the spike 306.

The spike 306 is preferably made of a hard material such as hardened steel or carbide. The spike 306 is threaded into, pressed into, or secured with a suitable adhesive, and can be permanently attached or be replaceable. When replaceable, the spike 306 can be threaded into the device 300, for example. The spike 306 has an initial diameter of 3/16 inches and tapers uniformly down to nearly a point. Preferably, the glass breaking spike 306 is made of carbide steel, C5 grade. This design concentrates the impact load on the desired location to maximize the stress applied to the glass 396 (in FIGS. 2A–2D) for efficient breaking power. This arrangement further results in less flying glass and breakage in only the desired location to protect those in the vicinity from being cut.

Referring next to FIGS. 2A through 2D, there is a cross-section of the glass breaker 300 in four of its primary operating positions. In each of the figures, the glass breaker 300 can be seen as including: the housing 302, the safety sheath 304, the glass-breaking spike 306, a spike shaft 320, a spike shaft collar 322, a sleeve 324, a hammer 328, a safety sheath spring 332, a spike shaft spring 334, and a hammer spring 336. All of the components of this preferred embodiment are symmetrical about and move parallel to the longitudinal axis 338.

In addition to the features described above, the cross-sectional views illustrate that the housing 302 has two internal diameters, a large internal diameter 340 and a small internal diameter 342. The large internal diameter 340 portion accommodates movement of the safety sheath 304 while the portion of small internal diameter 342 provides an annular surface on which the sleeve 324 bears. In addition, the large internal diameter 340 portion houses a light safety sheath compression spring 332 which biases the safety sheath 304 coaxially outwardly (to the right, as viewed) from the housing 302. A step 344 between the small diameter 342 and large diameter 340 housing portions serves as a bearing surface for the safety sheath spring 332.

Figure 2A:
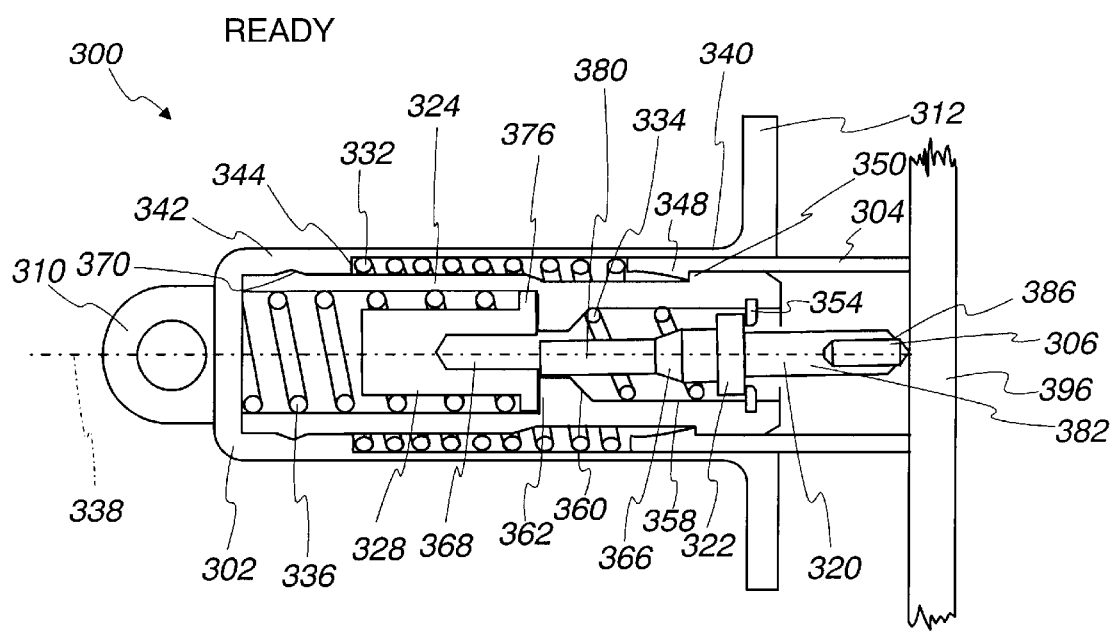
FIG. 2A is a cross-sectional view of a spring-loaded window breaker in the "ready" position.
Figure 2B:
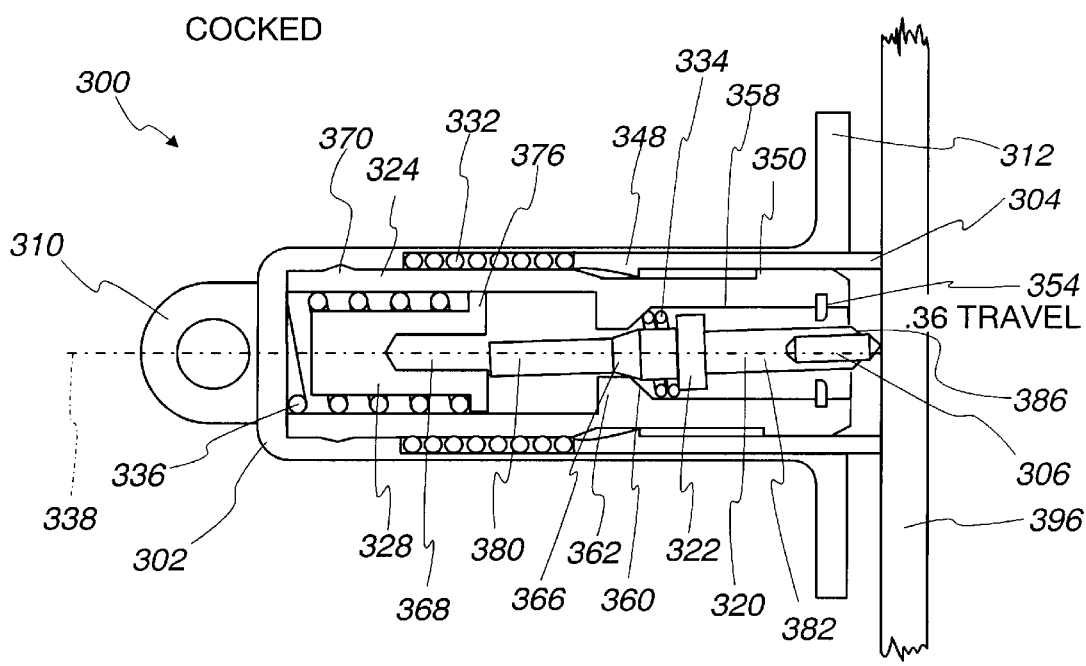
FIG. 2B is the spring-loaded window breaker of FIG. 2A, in the cocked position.

In addition to the description of the safety sheath 304 above, the cross-sectional views of FIGS. 2A to 2B show that its inner surface includes an annular tab 348 that acts on a corresponding shoulder 350 of the sleeve 324 to prevent the safety sheath spring 332 from urging the safety sheath 304 out of the housing 302 completely.

Interior to the safety sheath 304 is the cylindrical sleeve 324 that includes a variety of radially inwardly extending shapes described in detail below. The sleeve 324 extends the full length of the housing 302 in the preferred embodiment. At the open end (to the right as illustrated), the sleeve 324 includes a radial retainer ring 354 that provides a stop to prevent the spike shaft 320 from being forced out of the housing 302 when struck by the hammer 328.

Inward (to the left as viewed) of the retainer ring 354, there is a smooth constant diameter portion 358 that ends with an inwardly extending ramp 360, on the inward side (left side, as viewed) of which there is a hammer stop platform 362. The purpose of the ramp 360 is to aid in alignment of the spike shaft 320 during operation by engaging a mating shaft ramp surface 366 on the spike shaft 320.

The hammer stop platform 362 prevents the hammer from being thrust outward of the housing 302 when the glass breaker 300 is fired.

Inward (to the left as viewed) of the hammer stop platform 362, is a smooth hammer bore portion 368 in which the hammer 328 slides during operation. Also, in an annular space defined by the hammer bore portion 368 and the hammer 328 is disposed the hammer spring 336.

Near the inward (left end) of the sleeve 324 is an outer ring 370 that engages a matching recess in the housing 302 to provide a snap engagement between the housing 302 and the sleeve 324 for ease of assembly.

The hammer 328 includes a hammer flange 376 on which the hammer spring 336 exerts its force. The hammer flange 376 also serves to prevent the hammer 328 from being trust outwardly by engaging the hammer stop platform 362, as described above.

The hammer 328 also includes an inner bore 378 for receiving and impacting the spike shaft 320 when the glass breaker 300 is fired.

The spike shaft 320 includes a portion of relatively small outer diameter 380, the shaft ramp 366 (described above), and a portion of relatively large diameter 382. The small diameter portion 380 mates with the hammer bore 378 as described above. The shaft ramp 366 mates with the sleeve ramp 360, as described above.

The large diameter portion 382 includes an outwardly extending bore 386 into which the glass breaking spike 306 is inserted and held, either using a set-screw (not illustrated) or a press fit.

The large diameter shaft portion 382 also includes an integral or separately manufactured collar 322, which maintains the spike shaft 320 in contract with the sleeve 324 by slidably engaging the large internal diameter portion 342 of the sleeve 324.

The spike shaft 320 is typically maintained in a position that is slightly out of coaxial alignment with the other elements of the glass breaker 300. The spike shaft 320 is biased toward this position (see: FIGS. 2A and 2B) by spike shaft spring 334 so the inner (left) end of the spike shaft 320 engages the outer (right) end of the hammer 328. This engagement holds the hammer 328 in place while the hammer spring 336 is being compressed, as described in more detail below. This spike shaft 320 is realigned against the force of the spike shaft spring 334 when the spike shaft ramp 366 is engaged by the sleeve ramp 360 during operation. This engagement of the ramps shifts the orientation of the spike shaft 320 to a more coaxial alignment with the other components. When this occurs, the ends of the spike shaft 320 and the hammer 328 disengage and the hammer spring 336 is able to urge the hammer 328 toward the spike shaft 320.

The spike shaft spring 336 is an eccentrically wound spring made of a wire with a large diameter at its inner (left) end and a smaller diameter at its outer (right) end. This type of spring is capable of exerting all axial force, as well as a slight side load, which in this case, intentionally misaligns the spike shaft 320, as described.

Operation

During operation, the glass breaker 300 proceeds through essentially four primary operating positions: the ready position (FIG. 2A); the cocked position (FIG. 2B); the fire position (FIG. 2C); and the break position (FIG. 2D).

In the ready position, the housing 302 and sleeve 324 are spaced from a pane of glass 396, the safety sheath 304 is placed against the glass 396, the hammer 328 is resting against the sleeve 324, the spike shaft 320 is at its outermost position (right-most) relative to the housing 302, and the glass-breaking spike 306 is resting against the glass 396.

Also in the ready position (FIG. 2A), the safety sheath spring 332 is biasing the safety sheath 304 outward to shield the spike 306 from inadvertent damage to people and property. The spike shaft spring 334 is biasing the spike shaft out of coaxial alignment with axis 338 to engage the hammer 328, and the hammer spring 336 has a slight bias on the hammer 328 toward the sleeve's hammer stop platform 362.

In the cocked position (FIG. 2B), a user (not illustrated) has exerted finger pressure against the finger platform 312 of the housing 302 to move the housing 302 and the sleeve 324 toward the glass 396. The distance moved toward the glass 396 is not the complete length to be traveled by the housing 302 and sleeve 324, but in a preferred embodiment, it is about 90% of the entire travel distance. In a most preferred embodiment, the distance traveled by the housing 302 and the sleeve 324 between the ready position (FIG. 2A) and the cocked position (FIG. 2B), is about 0.36 inches.

Also in response to the user pressing on the finger platform, the safety sheath spring 332 is compressed so that the safety sheath 304 can remain in contact with the glass 396, but also slide into the housing 302, as illustrated.

The movement of the sleeve 324 compresses the hammer spring 336 against the hammer 328. The hammer is maintained in position by the end of the spike shaft 320 and the spike shaft spring 334, as described.

The spike shaft 320 has been moved inward (to the left) relative to the sleeve 324 and housing 302, but the spike shaft ramp 366 has not engaged (in any appreciable amount) the sleeve ramp 360.

In the fire position (FIG. 2C), the user has pushed the housing 302 and the sleeve 324 their entire distance of travel toward the pane of glass 396. Preferably, the distance between the housing in the cocked position and the fire position is about 10% of the total distance traveled by the housing 302 during operation. In a most preferred embodiment, that distance is about 0.03 inches, while the total distance from ready (FIG. 2A) to fire (FIG. 2B) is 0.39 inches.

When the housing 302 has been moved to the fire position (FIG. 2C), the safety sheath 304 is still compressing the safety sheath spring 334.

The additional movement of the housing 302 and the sleeve 324 has forced the sleeve ramp 360 into contact with the spike shaft 320 ramp 366. The engagement of the sleeve ramp 360 and the spike shaft ramp 366 to align the spike shaft 320 coaxially against the bias of the spike shaft spring 334, which in turn disengages the spike shaft 320 and the hammer 328. When disengaged, the hammer spring 336 is no longer compressed and the hammer spring 336 will, in an instant, expand to move the hammer 328 outwardly (to the right as viewed).

The result of the hammer spring 336 expanding, is that the hammer 328 impacts the spike shaft 320 to break the glass 396 (FIG. 2D). In this position, the housing 302 and sleeve 324 are still at their greatest distance traveled, the safety sheath is still in contact with the glass to shield the user from flying glass, and the glass breaking spike 306 impacts the glass 396 for only a small distance, but enough to shatter the glass 396.

Al of the above-described movements can take place as a result of a single pushing movement by the user, and they all occur in a short time. Thus, the glass breaker 300 is useful in emergencies and can be used with little thought as to its operation.

Suitable materials for the glass breaker components include, but are not limited to: housing (plastic such as nylon); safety sheath (low strength impact resistant plastic such as polyethylene); spike shaft (metal such as carbon steel); sleeve (High Impact plastic such as nylon, or lightweight metal such as aluminum); spike shaft collar (preferably a standard retaining ring made from spring steel); hammer (low carbon steel); and springs (music wire).

A foam doughnut (not pictured) may be placed between the sheath and the spike shaft to limit dirt infiltration into the mechanism, and to maintain a coaxial position on the spike end of the spike shaft relative to the sheath during firing.

The materials specified above for use in the multipurpose tool provide sufficient strength and rigidity for most situations, while concurrently providing a lightweight tool that is easily manufactured and carried. Also, the proportions of the handle 22 and spanner claw provide additional rigidity and also substantial surface area on which information or advertising can be printed. It should be understood that the exact arrangement of the tool's functional features is not limited to the single embodiment depicted in the drawings. Further, the tool 20 as illustrated includes numerous ornamental features that add to the tool's distinctive look, separate and apart from the functional features described above.

The foregoing detailed description of the drawings is provided for clearness of understanding only, and is not intended to unnecessarily limit the claims below.

What is claimed is:

1. A glass breaking apparatus comprising:

a housing;

a safety sheath slidably disposed in the housing;

a sleeve disposed in the housing for movement with the housing along an axis;

a spike shaft disposed in the sleeve;

a spike shaft spring in biasing engagement with the spike shaft toward a cocked position;

a hammer disposed in the housing and releasably engaged to the spike shaft in a cocked position;

a hammer spring in biasing engagement with the hammer for movement of the hammer from a cocked position to a break position; and a glass-breaking spike supported by the spike shaft, shielded by the safety sheath, and disposed to be impacted by the hammer when the hammer moves from a cocked position to a break position;

wherein the housing is moved toward a glass pane to compress the hammer spring until the spike shaft is disengaged from the hammer to release the hammer and the glass-breaking spike to break glass.

* * * * *

UNITED STATES PATENT AND TRADEMARK OFFICE
CERTIFICATE OF CORRECTION

PATENT NO.   : 6,418,628 B1                                          Page 1 of 1
DATED        : July 16, 2002
INVENTOR(S)  : Robert W. Steingass It is certified that error appears in the above-identified patent and that said Letters Patent is hereby corrected as shown below:

<u>Title page,</u>
Item [57], ABSTRACT, please replace the ABSTRACT with the following:

-- A glass breaking apparatus having at least: a housing; a retractable safety sheath; a spring-loaded hammer; and a glass breaking spike disposed to be impacted by the spring-loaded hammer when the hammer moves from a cocked position to a break position. To break glass, the housing is moved toward a glass pane to retract the safety sheath, compress the hammer spring, and move the hammer to a cocked position. Further, movement of the housing toward the glass releases the hammer to its break position where it forces the glass breaking spike into contact with the glass pane. --

Signed and Sealed this

Twenty-ninth Day of July, 2003

JAMES E. ROGAN
*Director of the United States Patent and Trademark Office*